Oct. 13, 1970  J. WELCH  3,533,150

HOLDER FOR A CUTTING TOOL BIT

Filed Oct. 28, 1968  2 Sheets-Sheet 1

INVENTOR
JOHN WELCH

United States Patent Office 3,533,150
Patented Oct. 13, 1970

3,533,150
HOLDER FOR A CUTTING TOOL BIT
John Welch, Tonbridge, England, assignor to Diagrit Grinding Company Limited, Tonbridge, Kent, England
Filed Oct. 28, 1968, Ser. No. 771,257
Claims priority, application Great Britain, Nov. 8, 1967, 50,702/67
Int. Cl. B26d 1/00
U.S. Cl. 29—96
7 Claims

ABSTRACT OF THE DISCLOSURE

A lathe tool bit resting on a seating face on a tool body is clamped against an abutment by a pin screwed into the body normal to the seating face. One end of the pin is a loose fit in a bore in the bit. A conical concentric portion of the pin when tightened engages a conical face concentric with the threaded bore in the body moving the axis of the pin towards the threaded bore axis so that the upper end of the pin moves over in the bore in the bit to trap the latter against the abutment.

---

This invention relates to a holder for a cutting tool bit, and is applicable particuarly, but not exclusively, to cutting tools used in lathes, shaping, milling, planing or broaching machines.

It is well known for cutting tools to include a holder, a detachable cutting tool bit and often a seating member for the bit. A clamping means is usually arranged so that the bit may be clamped to the holder in different positions so that fresh cutting edges are made available.

An object of this invention is to provide a holder having a cheap and firm clamping means.

According to the invention, a holder for a cutting tool bit includes a body having a seating face for supporting the bit, stop means for locating the bit on the seating face, a threaded pin engaging a correspondingly threaded bore in the body substantially normal to the seating face, the threaded pin having a concentric portion for engaging a clamping face of the bit, the threads are arranged to have relative clearance at least when the pin is partially unscrewed from the body so that the pin may be then moved in a direction away from the stop means to enable the bit to be placed with its clamping face intermediate the concentric portion and the stop means, and a portion of the pin concentric with the thread on the pin is arranged to coact with a portion of the body concentric with the thread in the body as the pin is screwed into the body such that the axis of the pin is moved towards the axis of the said bore in the body, whereby the said concentric portion of the pin will engage the clamping face of the bit and trap the bit firmly against the stop means. Preferably the said concentric portion of the pin is cylindrical.

According to a feature of the invention, a portion of the thread on the pin near one end of the thread may have an enlarged tip radius such that when the said portion of the thread is disengaged from the thread in the body the pin will be slack in the body, and when the said portion of the thread is screwed into engagement with the thread in the body the pin will no longer be a clearance fit in the body and will be moved towards the stop means.

According to another feature, a portion of the thread on the pin near one end of the thread may have an enlarged root radius such that when the said portion of the thread is disengaged from the thread in the body the pin will be slack in the body, and when the said portion of the thread is screwed into engagement with the thread in the body the pin will no longer be a clearance fit in the body and will be moved towards the stop means.

According to a further feature, a portion of the thread in the body near an end of the thread on the pin may have a tip of smaller radius such that when the pin is disengaged from the said portion of the thread in the body the pin will be slack in the body, and when the pin is screwed into engagement with the said portion of the thread in the body the pin will no longer be a clearance fit in the body and will be moved towards the stop means.

According to yet another feature a portion of the thread in the body near an end of the thread on the pin may have a root of smaller radius such that when the pin is disengaged from the said portion of the thread in the body the pin will be slack in the body, and when the pin is screwed into engagement with the said portion of the thread in the body the pin will no longer be a clearance fit in the body and will be moved towards the stop means. Preferably the threads on the pin and the body are of rectangular cross-sectional form.

According to another feature, the pin may be formed near one end with a frusto-conical surface which is arranged to engage a corresponding frusto-conical surface formed on the body coaxial with the thread in the body as the pin is screwed into the body, whereby clearance between the pin and the body will be taken up and the pin will become centralised.

According to a further feature, the holder may include a further frusto-conical surface formed near the opposite end of the pin to the aforesaid frusto-conical surface for engagement with a further corresponding frusto-conical surfaces formed on the body, and the frusto-conical surface formed on the pin are arranged to engage at the same time the respective corresponding frusto-conical surfaces formed on the body.

The invention is now described, by way of example only, with reference to the accompanying drawings as applied to a lathe tool.

Figure 1:
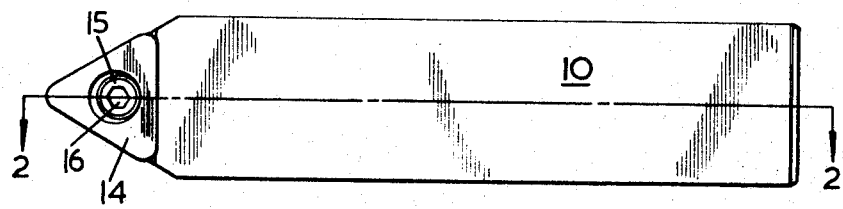
FIG. 1 is a plan view of a lathe tool.

A steel tool body 10 is formed with a seating face 11 and an abutment face 12, substantially normal to the face 11. A ground seating member 13 rests on the seating face 11 and supports a tool bit 14. The seating member 13 and the bit 14 are made of steel or cemented carbide and are fastened to the body 10 by a threaded pin 15 which has a hexagonal socket 16, or other suitable means for engaging an adjusting tool, formed in its upper or, if preferred, in its lower end.

An upper concentric cylindrical portion 17 of the pin 15 is a slack fit in a parallel bore 18 in the bit 14. For holding a bit 15 which has a positive rake the bore 18 often has a frusto-conical or lobe-sectioned form and the portion 17 of the pin 15 is then arranged to have a corresponding shape. A lower concentric cylindrical portion 19 of the pin 15 is a clearance fit in a bore 20 in the seating member 13. A flange 21, formed on the pin 15 at the junction of the upper and lower cylindrical portions 17, 19, is a clearance fit in a counter bore 22 in the seating member 13 and serves to prevent the seating member 13 from being lost as long as the pin 15 is engaged with the body 10. Immediately below the lower cylindrical portion 19 the pin 15 is formed with a frusto-conical portion 23 which engages a corresponding frusto-conical bore 24 in the body 10.

Figure 2:
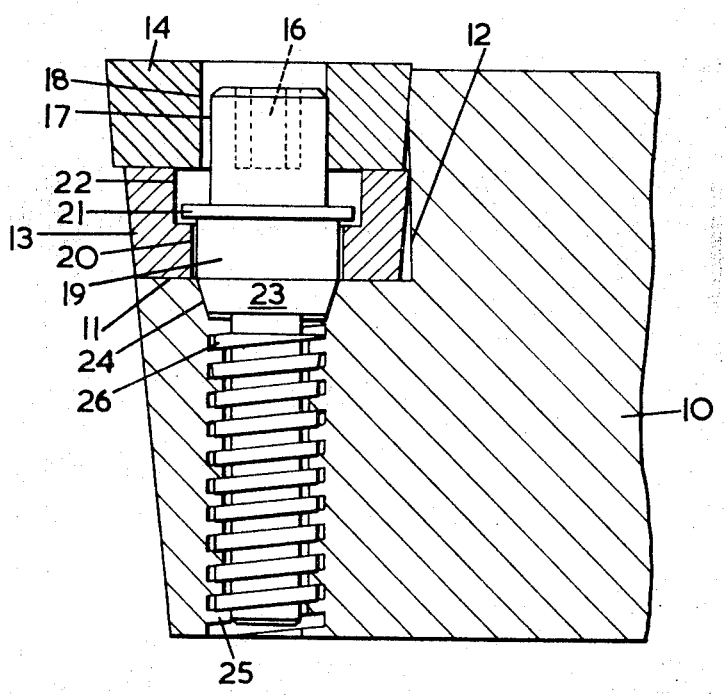
FIG. 2 is an enlarged portion of a section along the line 2—2 in FIG. 1.

In FIGS. 1 and 2 the pin 15 and the body 10 are formed with corresponding screw threads of square section and having transverse clearance between the respective tips and roots so that until tightened the pin may float laterally for a limited distance. Exceptions to the clearance are the lowest full thread 25 of the body 10, which is a running fit on the root of the pin thread, and the uppermost full thread 26 of the pin whose tip is a running fit in the root of the body thread.

When the pin 15 has been screwed upwards by an amount which is conveniently one turn the pin 15 will be disengaged from the thread 25, the thread 26 will be disengaged from the body 10 and the frusto-conical portion 23 will be disengaged from the body 10. The pin 15 will then be free to float laterally so that the bit 14 may be dropped over the upper cylindrical portion 17 of the pin 15.

On screwing the pin 15 into the body, the engagement of the frusto-conical surfaces 23, 24 together with the engagement of the top and bottom threads 26, 25 will cause the pin 15 to be moved transversely, with its axis still vertical, or at a constant inclination if it is not originally vertical, towards the central position. As this occurs the upper cylindrical portion 17 will engage the bore 18 and will trap the bit 14 firmly against the abutment face 12.

Figure 3:
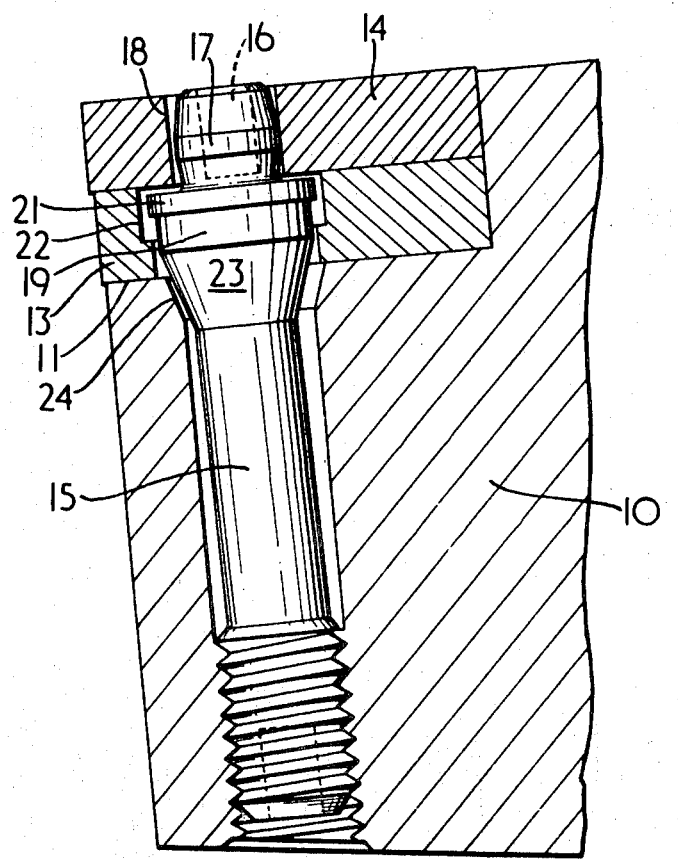
FIG. 3 is an enlarged view in section of an alternative embodiment.

The action of the conical surfaces 23, 24 and of the upper full thread 26 are supplementary and for certain applications a satisfactory locking of the bit 14 to the body 10 may still be achieved if one of those features is omitted, as shown in FIG. 3. Although a square thread form has been described other suitable forms may be used provided they are adequately durable and have lateral clearance when untightened. Just as the upper portion of the pin 15 may be centralised by the conical surfaces 23, 24 as it is screwed downwards, so the lower part of the pin could be centralised by a frusto-conical lower end of the pin engaging in a corresponding frusto-conical bore formed in the lower part of the body 10.

If preferred the root of the top thread 26 may be enlarged to engage the tip of the body thread so that the tip of the thread 26 may be of normal diameter. Similarly the root, instead of the tip, of the bottom thread 25 may be of reduced diameter for engaging the tip of the pin thread.

What I claim as my invention and desire to secure by Letters Patent of the United States is:

1. A holder for holding a cutting tool bit, including a body defining a seating face for supporting the bit, stop means for locating the bit on the seating face, a threaded bore in the body substantially normal to the seating face, a threaded pin engaging said threaded bore, the threaded pin having a concentric portion for engaging a clamping face of the bit, the threads of said threaded bore and said threaded pin are arranged to have relative clearance at least when the pin is partially unscrewed from the body so that the pin may be then moved in a direction away from the stop means to enable the bit to be placed with its clamping face intermediate the concentric portion and the stop means, wherein the improvement comprises that a portion of the pin concentric with the thread on the pin is arranged to coact with a portion of the body concentric with the thread in the body as the pin is screwed into the body such that the axis of the pin is moved towards the axis of the said bore in the body, whereby the said concentric portion of the pin will engage the clamping face of the bit and trap the bit firmly against the stop means.

2. A holder, as in claim 1, in which a portion of the thread on the pin near one end of the thread has an enlarged tip radius such that when the said portion of the thread is disengaged from the thread in the body the pin will be slack in the body, and when the said portion of the thread is screwed into engagement with the thread in the body the pin will no longer be a clearance fit in the body and will be moved towards the stop means.

3. A holder, according to claim 1, in which a portion of the thread on the pin near one end of the thread has an enlarged root radius such that when the said portion of the thread is disengaged from the thread in the body the pin will be slack in the body, and when the said portion of the thread is screwed into engagement with the thread in the body the pin will no longer be a clearance fit in the body and will be moved towards the stop means.

4. A holder, as in claim 1, in which a portion of the thread in the body near an end of the thread on the pin has a tip of smaller radius such that when the pin is disengaged from the said portion of the thread in the body the pin will be slack in the body, and when the pin is screwed into engagement with the said portion of the thread in the body the pin will no longer be a clearance fit in the body and will be moved towards the stop means.

5. A holder, as in claim 1, in which a portion of the thread on the body near an end of the thread on the pin has a root of smaller radius such that when the pin is disengaged from the said portion of the thread in the body the pin will be slack in the body, and when the pin is screwed into engagement with the said portion of the thread in the body the pin will no longer be a clearance fit in the body and will be moved toward the stop means.

6. A holder, as in claim 1, in which the pin is formed near one end with a frusto-conical surface which is arranged to engage a corresponding frusto-conical surface formed on the body coaxial with the thread in the body as the pin is screwed into the body, whereby clearance between the pin and the body will be taken up and the pin will become centralised.

7. A holder, as in claim 6, including a further frusto-conical surface formed near the opposite end of the pin to the aforesaid frusto-conical surface for engagement with a further corresponding frusto-conical surface formed on the body, and the frusto-conical surfaces formed on the pin are arranged to engage at the same time the respective corresponding frusto-conical surfaces formed on the body.

References Cited
UNITED STATES PATENTS

| | | | |
|---|---|---|---|
| 2,598,581 | 5/1952 | McKenna | 29—96 |
| 3,341,920 | 9/1967 | Keln | 29—96 |

HARRISON L. HINSON, Primary Examiner